United States Patent
Nonaka (10) Patent No.: US 8,522,138 B2
(45) Date of Patent: Aug. 27, 2013

(54) CONTENT ANALYSIS APPARATUS AND METHOD

(75) Inventor: Shunichiro Nonaka, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 70 days.

(21) Appl. No.: 13/181,273

(22) Filed: Jul. 12, 2011

(65) Prior Publication Data
US 2012/0017144 A1  Jan. 19, 2012

(30) Foreign Application Priority Data

Jul. 13, 2010 (JP) .................................. 2010-159003
Sep. 29, 2010 (JP) .................................. 2010-219355

(51) Int. Cl.
*G06F 17/00* (2006.01)
(52) U.S. Cl.
USPC .......................................... 715/240; 715/243
(58) Field of Classification Search
USPC .......................................... 715/200, 243, 240
See application file for complete search history.

(56) References Cited

U.S. PATENT DOCUMENTS

| 7,474,802 | B2 * | 1/2009 | Zhou et al. ..................... 382/284 |
| 2004/0080541 | A1 | 4/2004 | Saiga et al. |
| 2007/0279437 | A1 | 12/2007 | Morimoto |
| 2010/0289818 | A1 * | 11/2010 | Hirooka ........................ 345/619 |

FOREIGN PATENT DOCUMENTS

| JP | 11-272399 A | 10/1999 |
| JP | 2001-025024 A | 1/2001 |
| JP | 2002-041401 A | 2/2002 |
| JP | 2004-185456 A | 7/2004 |
| JP | 2007-164550 A | 6/2007 |
| JP | 2007-226255 A | 9/2007 |
| JP | 2007-256529 A | 10/2007 |
| JP | 2009-301055 A | 12/2009 |
| JP | 2010-87717 A | 4/2010 |
| WO | WO 2007/069343 A1 | 6/2007 |

OTHER PUBLICATIONS

Notification of Reason(s) for Rejection dated Jul. 20, 2012, with English translation.

* cited by examiner

*Primary Examiner* — Manglesh M Patel
(74) *Attorney, Agent, or Firm* — McGinn IP Law Group, PLLC (57) ABSTRACT

The present invention provides a content analysis apparatus including an input section which inputs original content; a content analyzer which analyzes details of the original content input into the input section and acquires content analysis information which is information pertaining to the content; and an anchor point information generator which analyzes an anchor point where a visual line of a reader stops and a transition sequence of the anchor point with respect to the original content input into the input section pursuant to a prescribed analysis rule corresponding to the original content input into the input section, and generates anchor point information indicating the analyzed anchor point and the transition sequence of the anchor point.

18 Claims, 10 Drawing Sheets

SCANNED IMAGE (1) DETECT FRAME

FIG.10D (3) MOVEMENT OF VISUAL AXIS IN FRAME

FIG.10C (2) DETERMINE FRAME SEQUENCE

FIG.10B (1) DETECT FRAME

FIG.10A

SCANNED IMAGE

CONTENT ANALYSIS APPARATUS AND METHOD

BACKGROUND OF THE INVENTION

1. Field of the Invention

The present invention relates to an apparatus and a method which display various types of contents digitized from paper-based contents, such as cartoons, newspapers, magazines, documents, textbooks and reference books.

2. Description of the Related Art

In Japanese Patent Application Laid-Open No. 2007-226255, a reproduction sequence of frames of a cartoon is determined on the basis of a sequence assumed by an author of the cartoon as a sequence of frames. For example, identification numbers are assigned to respective frames; the reproduction sequence is determined as data of disposition of the identification numbers. In order to facilitate reading on a size of a display apparatus for reproduction, a plurality of display positions may be determined in one large frame on a space of the cartoon, and the positions may be predetermined as frames.

In Japanese Patent Application Laid-Open No. 2007-164550, a file of a Flash cartoon content is created according to a preset frame display sequence. This Flash content file is created by a personal computer performing a prescribed Flash creation application pursuant to an instruction by a business owner. Accordingly, the Flash content file is created in which each page includes image data of the page and a frame display sequence instruction (frame display sequence).

In Japanese Patent Application Laid-Open No. 2002-41401, a plurality of articles published in an information providing medium, such as a newspaper and a magazine, are stored as article information while a style in which the articles are published in the information providing medium is maintained, by storing data created by scanning the article. A piece of article information is identified among the stored pieces of article information on the basis of instruction information received from an information terminal via a communication line. Output information is generated on the basis of the identified piece of article information. The generated output information is transmitted in order to be output to a recording medium. Accordingly, information intended by a user can be acquired in the style published in the information providing medium such as a magazine.

Other conventional arts related to the present invention include Japanese Patent Application Laid-Open Nos. 2001-25024 and 11-272399.

The arts which preliminarily determine the dispositions of respective frames by a user's manual operation and input the determined data as with Japanese Patent Application Laid-Open Nos. 2007-226255 and 2007-164550, are very complicated. The conventional arts do not refer to a device which sequentially distributes digitized content to terminals with various specifications and forms according to the data and causes the terminals with various specifications and forms to reproduce the content.

SUMMARY OF THE INVENTION

The present invention provides a technique which determines a display position and a display sequence of a digital document automatically or semi-automatically.

The present invention provides a content analysis apparatus including an input section which inputs original content; a content analyzer which analyzes details of the original content input into the input section and acquires content analysis information which is information pertaining to the content; and an anchor point information generator which analyzes an anchor point where a visual line of a reader stops and a transition sequence of the anchor point with respect to the original content input into the input section pursuant to a prescribed analysis rule corresponding to the original content input into the input section, and generates anchor point information indicating the analyzed anchor point and the transition sequence of the anchor point.

Preferably, the content analysis apparatus further includes: a converter which converts the original content input from the input section into distribution content which is an image according to the anchor point information and a model type of a terminal; and an information embedding section which embeds the anchor point information generated by the anchor point information generator in the distribution content converted by the converter.

Preferably, the content analysis apparatus further includes: a scenario generator which determines a stop time of the distribution content for each anchor point generated by the anchor point information generator according to at least one of the model type of the terminal and the content analysis information, and generates a scenario indicating the stop time for each anchor point.

Preferably, the content analysis apparatus further includes: a content database in which the distribution content with the embedded anchor point information is stored for each model type of a terminal; a scenario database in which the scenario generated by the scenario generator is stored and associated with at least one of the model type of the terminal and the content analysis information a distributor which extracts a scenario corresponding to a model type of a terminal accessing the apparatus from the scenario database, extracts distribution content corresponding to the model type of the terminal from the content database, and distributes the extracted scenario and the distribution content to the terminal; and a terminal which receives the scenario and the distribution content from the distributor, and reproduces the distribution content pursuant to the scenario.

Preferably, the scenario generator determines a display magnification of the distribution content for each anchor point generated by the anchor point information generator according to specification including a screen size of the terminal, and generates a scenario indicating the display magnification for each anchor point.

Preferably, the input section receives an image of the original content and supplementary information, and the content analyzer acquires the content analysis information on the basis of the image of the original content and the supplementary information.

Preferably, the anchor point information generator determines a sequence for elements in the original content input into the input section pursuant to a prescribed analysis rule corresponding to the original content input into the input section, and generates the anchor point information on the basis of the sequence of the respective elements and the sizes of the respective elements.

Preferably, the content analyzer accepts a selection of the type of the content to be analyzed, and analyzes the elements of the content according to the selected type of the content.

Preferably, the content analyzer, in a case of accepting the selection of a cartoon as the type of the content to be analyzed, determines a frame of the cartoon by edge analysis and frame boundary candidate extraction.

Preferably, the content analyzer displays a result of the frame determination on a prescribed display apparatus.

Preferably, the anchor point information generator determines a sequence for each frame of the determined cartoon pursuant to a prescribed analysis rule corresponding to the cartoon input into the input section, and generates the anchor point information on the basis of the sequence of each frame and the frame size of each frame.

Preferably, the anchor point information generator, in a case where the determined frame of the cartoon does not fit within a screen size of a terminal, divides the frame into sizes fitting within the screen size, determines a sequence of frames including frames after division pursuant to a prescribed analysis rule corresponding to the cartoon, and generates the anchor point information on the basis of the sequence of the frames and the frame sizes.

Preferably, the anchor point information generator divides the frame so as to match a shape of a screen of the terminal.

Preferably, the anchor point information generator, in a case where the determined frames of the cartoon fit within a screen size of the terminal at the same time, integrates the frames, determines a sequence of frames including the frame after integration pursuant to a prescribed analysis rule corresponding to the cartoon, and generates the anchor point information on the basis of the sequence of the frames and the frame sizes.

The present invention provides a content analysis method causing a computer to perform: a step of inputting original content; a step of analyzing details of the input original content and acquiring content analysis information which is information pertaining to the content; and a step of analyzing an anchor point where a visual line of a reader stops and a transition sequence of the anchor point with respect to the input original content pursuant to a prescribed analysis rule corresponding to the input original content, and generating anchor point information indicating the analyzed anchor point and the transition sequence of the anchor point.

The present invention provides a non-transitory computer-readable medium having embodied thereon a content analysis program causing a computer to perform the content analysis method.

DETAILED DESCRIPTION OF THE PREFERRED EMBODIMENTS

Figure 1:
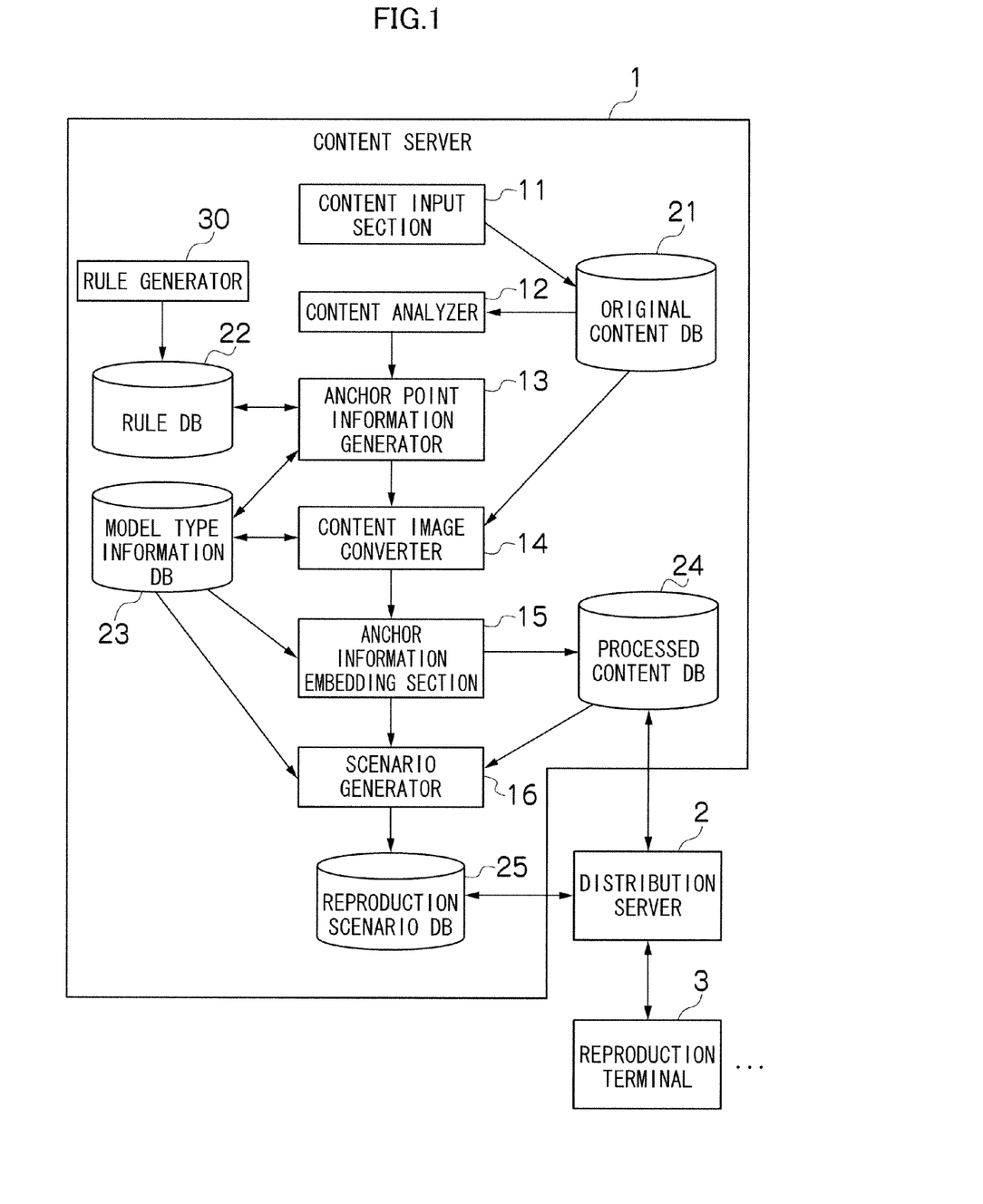
FIG. 1 is a schematic diagram of a configuration of a content distribution system.

FIG. 1 shows a configuration of a content distribution system of a preferred embodiment of the present invention.

This system includes a content server 1 and a distribution server 2. The content server 1 and the distribution server 2 include a computer (information processing apparatus) including a processing device (CPU), a storing device and an input and output circuit. The content server 1 and the distribution server 2 may be integrated in one computer.

The content server 1 includes a content input section 11, a content analyzer 12, an anchor point information generator 13, a content image converter 14, an anchor information embedding section 15, a scenario generator 16, an original content DB 21, a rule DB 22, a model type information DB 23, a processed content DB 24 and a reproduction scenario DB 25.

The content input section 11 receives an input of original content laid out in units of pages, such as articles of a cartoon, a newspaper and a weekly magazine, office documents (presentation documents etc.), a textbook, a reference book and the like. Any form of input may be adopted. The input can be made via a network such as a USB and the Internet or via a computer readable medium such as a memory card or a CD-ROM. The input original content is stored in the original content DB 21. The content stored in the original content DB 21 is digitized into digital data using a scanner or the like. Any form of storing the original content may be adopted. The content is stored in a form of a PDF file or an image file. Supplementary information may be recorded in the original content. This supplementary information may include author, title, the total number of pages, volume number, and the episode number of the content.

The content analyzer 12 analyzes the content stored in the original content DB 21 and the supplementary information, and outputs content analysis information. The content analysis information includes the type of content (articles of a cartoon, a newspaper, a weekly magazine, an office document, a textbook, a reference book, etc.), the author of the content, the title of the content, the episode number if the content includes a plurality of volumes and episodes, the number of pages of the content, the layout of content elements in each page (frames, drawings, type of character in the drawings, balloons, text, tables, diagrams, etc.), the features of the character (character name, and direction of visual line of the character, the size and position of the character, etc.), the details of the text, the position of the text, the amount of the text (the number of letters), and the delimiters of pages, sections, chapters, etc. The positions, sizes and types of the content elements may automatically be detected on the basis of the feature amounts of objects such as a face. The content elements may automatically be detected on the basis of machine learning. For example, the accuracy of detecting the outer edge of a frame, a threshold of determining appropriateness as a frame of a region other than a rectangle and the like are empirically set on the basis of a sample cartoon for learning.

The rule DB 22 stores an anchor point generation rule. For example, the rule DB 22 stores the anchor point generation rule according to the type of the content. The anchor point generation rule represents regularity of sequence of reading the content elements.

Figure 2A:
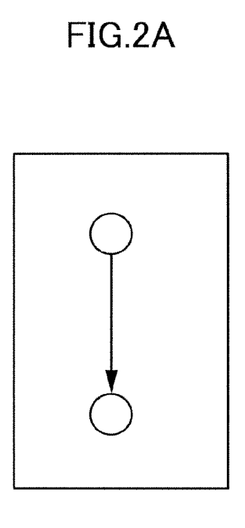
FIGS. 2A, 2B and 2C are diagrams showing an example of an anchor point.

More specifically, as exemplified in FIG. 2A, in a case where the type of content is a horizontally typeset office document, a rule of sequentially scanning the representative points of respective frames (centers or barycenters of frames) from an element whose position of the text included in the content analysis information is the highest to an element whose position of the text is the lowest is stored as an anchor point generation rule A.

Figure 2B:
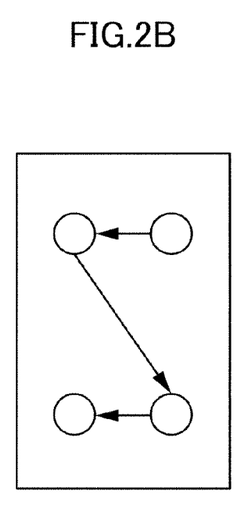

As exemplified in FIG. 2B, in a case where the type of the content is a cartoon, a rule of sequentially scanning in the horizontal direction the representative points of respective frames (centers or barycenters of frames) from an element whose position of the frame (or balloon) included in the content analysis information is the most upper right to an element whose position is the most lower left is stored as an anchor point generation rule B.

Figure 2C:
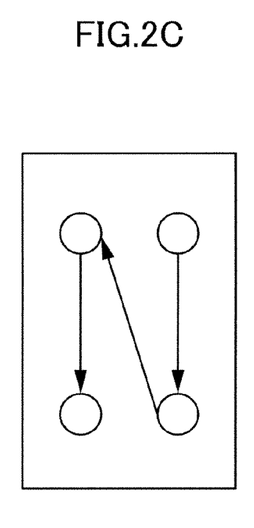

As exemplified in FIG. 2C, in a case where the type of the content is a vertically typeset newspaper, a rule of sequentially scanning in the vertical direction the representative points of respective frames from an element whose position included in the content analysis information is the most upper right to an element whose position is the most lower left is stored as an anchor point generation rule C.

The rule DB 22 is also capable of storing an anchor point generation rule according to the author of the content. This case is not shown in a diagram.

Not only rules of specifications according to the author and the type of content, but also rules according to the author and the type of content having been learnt by an artificial intelligence in a rule generator 30 may be stored in the rule DB 22.

For example, the learning by the rule generator 30 may be performed as follows. First, correct rules are preliminarily prepared for respective basic patterns. The rule generator 30 extracts feature amounts (thickness and length of a frame boundary) for the respective basic patterns. The rule generator 30 then estimates a sequence of reading frames assumed by the author of the content from the extracted feature amount. The rule generator 30 compares the sequence of reading estimated for each basic pattern with the correct rule, and optimizes a parameter for estimating the sequence of reading frames. The optimized parameter is stored in the rule DB 22.

The anchor point information generator 13 generates the anchor point information on the basis of the content analysis information output from the content analyzer 12 and the anchor point generation rule stored in the rule DB 22. The anchor point is a position (eye-stop) where the visual line stops for an element of the content for each page. The anchor point information generator 13 extracts an anchor point rule corresponding to the input type of the content from the anchor point generation rules for the respective types of content stored in the rule DB 22, and generates anchor point information according to the extracted anchor point generation rule and content analysis information.

The anchor point information includes position coordinates of the anchor point and information indicating the moving sequence and the moving direction of the anchor points. The anchor point information may include other various pieces of option information.

The content image converter 14 converts the original content stored in the original content DB 21 into an image with a format reproducible by a reproduction terminal. The converted image is referred to as reproduction content. The format reproducible by the reproduction terminal may be JPEG or the like. The content image converter 14 identifies corresponding screen size information from the model type information DB 23 on the basis of the model type information of the reproduction terminal 3 accessing the distribution server 2, resizes the resolution of the reproduction content so as to match with the identified screen information and regards the resized content as reproduction content. In this case, the content image converter 14 may be included in the reproduction terminal 3 instead of the content server 1.

Instead, the content image converter 14 may resize the resolution of the reproduction content according to screen size information of each model type stored in the model type information DB 23 and create the reproduction content for each model type.

The reproduction content includes an overview image and a detailed image. The overview image is a low-definition image representing the entire one page of content in an abbreviated manner. The detailed image is one or more high-definition image(s) which represents content elements around the anchor point in detail and corresponds to each eye-stop. For example, the detailed image is a high-definition image for each frame of the cartoon in which each anchor point determined according to the content analysis result is the representative point.

The anchor information embedding section 15 embeds the anchor point information generated by the anchor point information generator 13 in reproduction content for each model type converted by the content image converter 14. Any embedding method may be adopted. For example, XML formatted metadata is associated with the reproduction content. The reproduction content embedded with the anchor point information is stored in the processed content DB 24 for each piece of model type information.

The scenario generator 16 generates the reproduction scenario corresponding to the reproduction content of the processed content DB 24 on the basis of the content analysis information/model type information/reproduction state information. The generated scenario is stored and associated with the content analysis information/model type information/reproduction state information in the reproduction scenario DB 25. Any format of storing the scenario may be adopted. For example, as with the anchor information, the format is described in XML. The reproduction scenario may correspond to the entire content or to each page of the content. Note that the reproduction scenario corresponding to each page of the content is required to be distributed together when the overview image of each page is transmitted.

The reproduction scenario includes: an enlargement factor of the detailed image; a display switching speed from the detailed image corresponding to the previous anchor point to the detailed image corresponding to the subsequent anchor point and a display switching method (scrolling, fade-out/fade-in, etc.); stop time of the visual line at each anchor point, that is, stop time, or display time of the detailed image corresponding to each anchor point; disposition (the page and the section) of the overview image and the detailed image in the content; and headline information.

For example, stop time matching with the amount of text of the detailed image corresponding to each anchor point is set in the reproduction scenario. The larger the amount of text of the detailed image around each anchor point, the larger the amount of information in one screen becomes. The stop time is thus set longer in the reproduction scenario accordingly.

The enlargement factor of the detailed image at each anchor point is set so as to match with the reproduction terminal 3 accessing the distribution server 2, or stop time for each model type is set so as to match with the screen size for each model type stored in the model type information DB 23, in the reproduction scenario.

The speed of switching display between anchor points is set in the reproduction scenario. The speed may be determined from a previous browsing speed corresponding to a user of the reproduction terminal 3 accessing distribution server 2 having been acquired as reproduction state information. Instead, the speed may be determined by applying a previous browsing speed having acquired as reproduction state information from a plurality of reproduction terminals 3 having reproduced the same reproduction content to a prescribed mathematical expression (average etc.).

The display switching method may be a prescribed default switching method, or set on the basis of the content analysis information. For example, if a destination of the direction of visual line of a character in a frame A of the content matches with a frame B in the moving direction of the anchor point, a display switching method from the frame A to the frame B is set as scrolling.

The disposition of the overview image and the detailed image (page and section), headline information and the like in the content correspond to supplementary information in the original content.

The distribution server 2 extracts the reproduction scenario and the reproduction content corresponding to the model type information of the reproduction terminal 3 connected via a network, such as the Internet, from the reproduction scenario DB 25 and the processed content DB 24, respectively, and transmits the extracted reproduction scenario and the image to the reproduction terminal 3. The reproduction scenario and the reproduction content may be transmitted collectively or in units of reproduction (pages etc.).

The reproduction terminal 3 may be a mobile information terminal, such as a mobile phone, a smart phone or a tablet computer, and includes an information processing apparatus capable of reproducing an image, a display device and a communication device. The reproduction terminal 3 reproduces an image on the basis of the reproduction scenario received from the distribution server 2. An unspecified number of reproduction terminals 3 and their users access the distribution server 2.

Figure 3A:
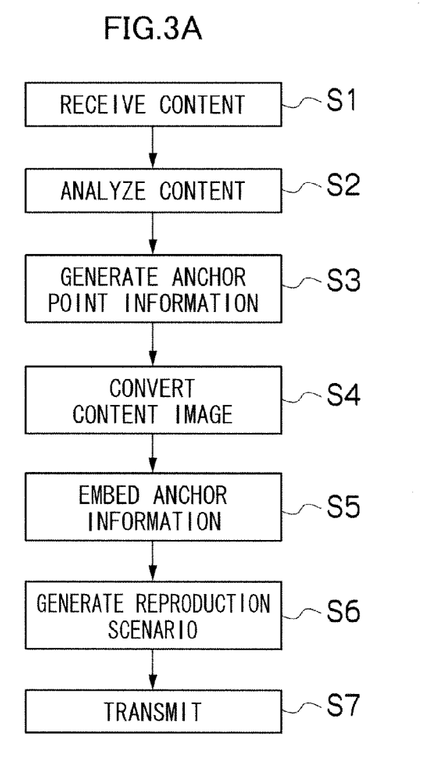
FIGS. 3A, 3B and 3C are flowcharts of a process of generating a scenario.

FIG. 3A shows a flowchart of a process of generating the scenario performed by the content server 1. A program causing the content server 1 to perform this process is stored in a non-transitory computer readable storing medium (RAM, ROM, CD-ROM, etc.) of the content server 1.

In step S1, the content input section 11 receives the original content.

In step S2, the content analyzer 12 analyzes the original content.

In step S3, the anchor point information generator 13 generates the anchor point information.

In step S4, the content image converter 14 converts the original content into the reproduction content for each piece of model type information.

In step S5, the anchor information embedding section 15 embeds the anchor point information in the reproduction content. The reproduction content embedded with the anchor point information is stored in the processed content DB 24 for each piece of model type information.

In step S6, the scenario generator 16 generates the reproduction scenario for each piece of model type information. The generated reproduction scenario is stored in the reproduction scenario DB 25 for each model type information of the reproduction terminal 3.

In step S7, the distribution server 2 transmits the reproduction scenario and the reproduction content corresponding to the model type information of the reproduction terminal 3 to the reproduction terminal 3.

Figure 3B:
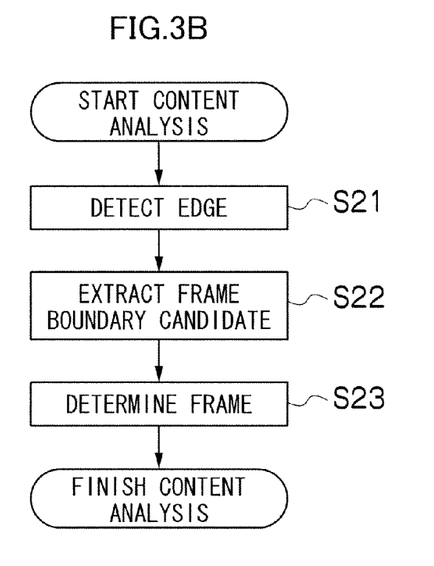

FIG. 3B shows a flow of content analysis (automatic detection of the content element) of step S2. This content analysis includes three steps, or edge detection (S21), frame boundary candidate extraction (S22) and frame determination (S23).

For example, when it is selected that the content is a comic for boys via a user interface, such as a mouse and a keyboard, content analysis corresponding to a comic for boys is started.

In the edge detection (S21), the content analyzer 12 functions as a process of detecting a framework of the outer edge of the frame. A specific method of edge detection itself may be performed as with conventional cases. For example, the method may be performed by detecting a high frequency component from the image acquired by scanning the content.

The outer edge of the frame may be a single line without a white line (white boundary) or an ornamental line. Thus, in a case incapable of detecting a framework by only detecting a high frequency component, a line segment configuring a side of the frame is estimated by applying Hough conversion.

As a result of the edge detection, a line which is not originally a framework of the frame or noise produced when scanning may be detected as a framework of the frame. Thus, the content analyzer 12 eliminates the noise in the edge and interpolates on a lacking part, and detects the resultantly remaining edge as the framework of the frame.

The frame boundary candidate extraction (S22) presents the user with the framework detected in step S21 as a frame boundary candidate on a display or the like, and prompts the user to verify the framework.

The frame determination (S23) determines the frame from a combination of boundary candidates. For example, if a closed region surrounded by the boundary candidate is a rectangle and has a certain extents of width and height, the content analyzer 12 determines that the closed region is a frame. The result of the frame determination is presented to the user on the display or the like, prompting the user to verify the result.

Figure 4A:
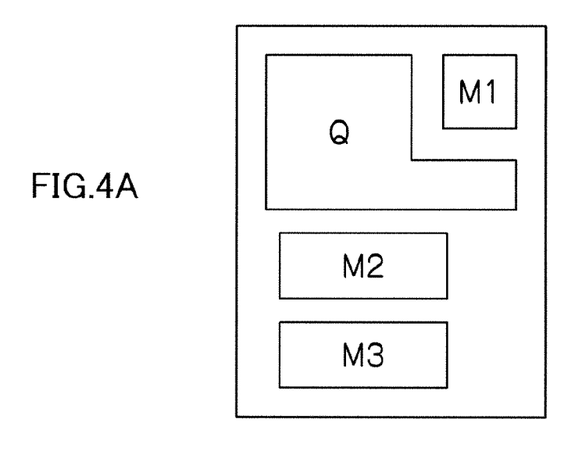
FIGS. 4A, 4B and 4C are diagrams showing an example of detecting an edge.

In order to address a case in which the frame is not a rectangle, the content analyzer 12 verifies appropriateness of whether remaining unspecified regions are frames or not, after determination of the rectangle frame. For example, as shown in FIG. 4A, rectangles M1 to M3 are determined as frames, but a region Q which is not a rectangle is regarded as an unspecified region. If the area, height, width, position and the like of the unspecified region Q satisfy certain thresholds, the unspecified region is determined as a frame.

Figure 4B:
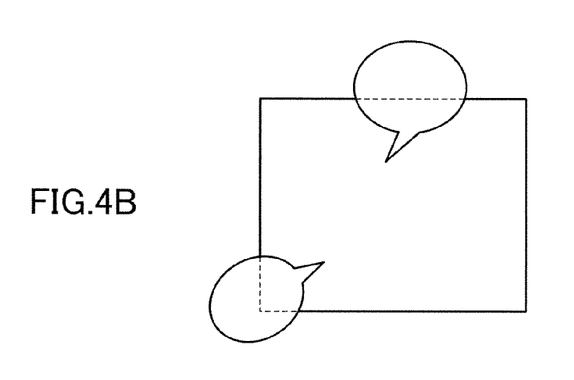

As shown in FIG. 4B, in a case where the outer edge of the frame is hidden or chipped by a balloon or the like, the divided boundary is virtually extended and then the extended line is integrated with the detected outer edge of the frame. Subsequently, appropriateness is verified of whether the region surrounded by the integrated outer edge is a frame or not.

Figure 4C:
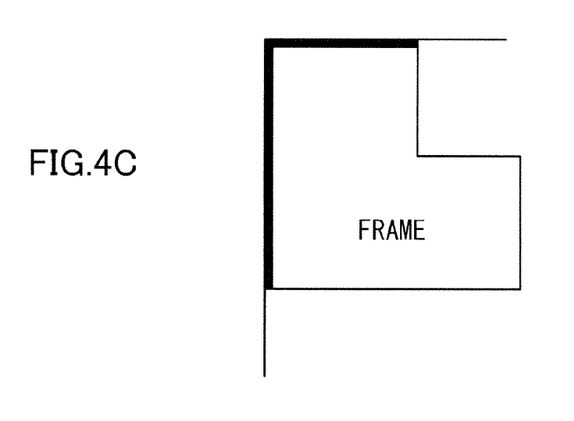

As shown in FIG. 4C, in a case where the frame extends to the edge of the page and the outer edge of the frame is not drawn as a line segment, a virtual boundary of the frame is arranged at the edge of the page and then the boundary is integrated with the detected outer edge of the frame. Subsequently, appropriateness is verified of whether the region surrounded by the integrated outer edge is a frame or not.

Figure 3C:
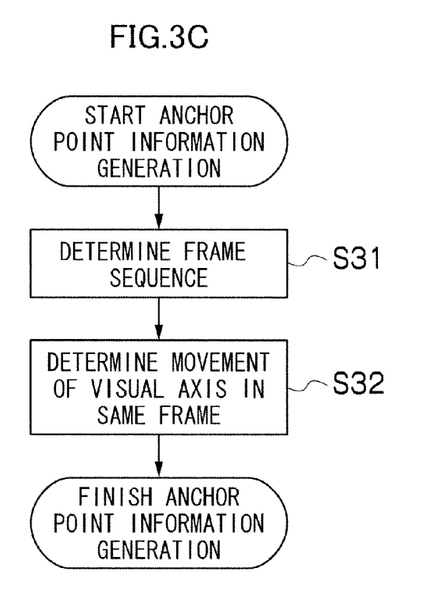

FIG. 3C shows a flow of generating the anchor point information in step S3. This generation of the anchor point information includes two steps, or frame sequence determination (S31) and determination of moving the visual line in the same frame (S32).

In the frame sequence determination (S31), the anchor point information generator 13 determines the sequence of reading frames (frame sequence) pursuant to the anchor point generation rule corresponding to the selected type of content. For example, in a case of a comic for boys, the frame sequence is determined pursuant to anchor point generation rule B in FIG. 2B.

In the determination of moving the visual line in the same frame (S32), the anchor point information generator 13 determines movement of the visual line (anchor point) of each of the frames whose frame sequence has been determined.

The anchor point is determined on a frame-by-frame basis. In a case where the frame size is larger or smaller than the screen size of the display device of the reproduction terminal 3, the frame size is adjusted so as to match with the screen size and then the anchor point is determined.

For example, assume that a certain frame does not fit within one screen of the reproduction terminal 3. In this case, the anchor point information generator 13 divides this frame into units capable of fitting within one screen. Next, the anchor point information generator 13 assigns a frame sequence again to the divided units pursuant to the anchor point generation rule corresponding to the selected type of content.

Figure 5A:
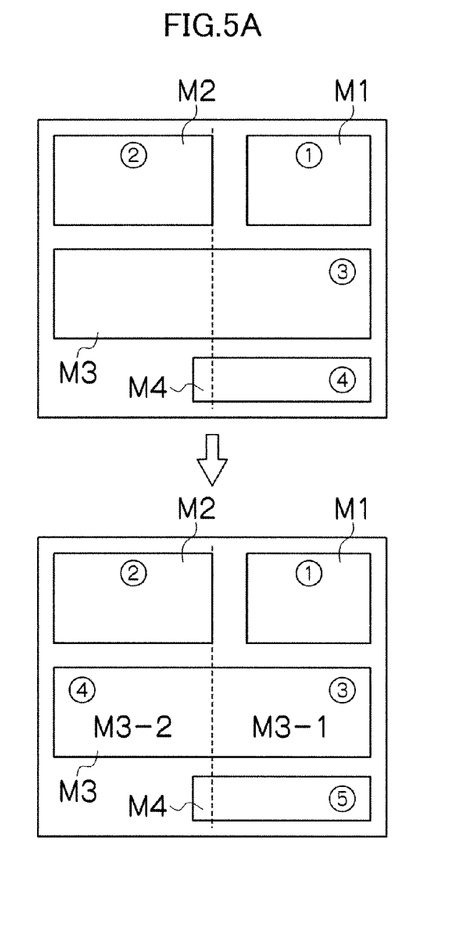
FIGS. 5A, 5B and 5C are diagrams showing an example of determining a frame sequence.

For example, as shown in FIG. 5A, assume that the frame sequence of the four frames M1 to M4 is determined. It is also provided that, although each of the frames M1 and M2 can fit within one screen of the reproduction terminal 3, the frame M3 cannot fit within one screen of the reproduction terminal 3. The anchor point information generator 13 divides the frame M3 into units capable of fitting within one screen. As a result, divided frames M3-1 and M3-2 are generated. The anchor point information generator 13 determines a frame sequence of the divided frames M3-1 and M3-2 pursuant to the anchor point generation rule B used for determining the frame sequence. In FIG. 5A, the divided frame M3-1 is arranged on the right of the divided frame M3-2. Accordingly, the divided frame M3-1 is assigned with a third turn 3 next to the frame M2 and the divided frame M3-2 is assigned with a fourth turn next to the divided frame M3-1. The frame sequence after the frame M3 is updated so as to be moved down as the turns are assigned to the divided frames. For example, the frame M4 has been assigned with the fourth turn, before division of the frame M3. However, the divided frame M3-1 is assigned to the next turn, or the fourth turn. Accordingly, the frame M4 is updated to be the fifth turn.

Figure 5B:
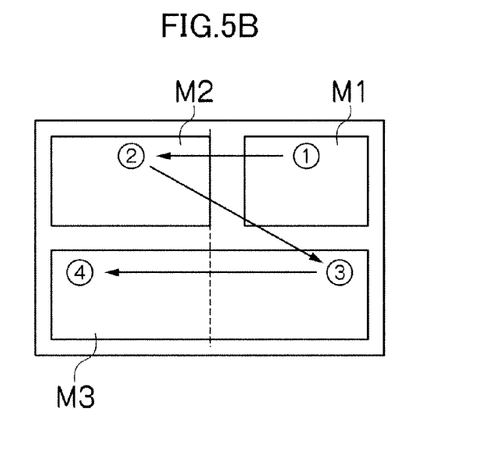

As exemplified in FIG. 5B, the number of divided frames may be two or more. In a case where the frame has a complicated shape, the frame is divided into shapes matching with the shape of a display screen, typically a rectangle, and then the frame sequence is determined.

On the contrary, assume that a plurality of frames with determined frame sequence fit within one screen of the reproduction terminal 3 at the same time. In this case, the anchor point information generator 13 integrates the plurality of frames into units fitting within one screen. Next, the anchor point information generator 13 assigns a frame sequence again to the integrated units pursuant to the anchor point generation rule corresponding to the selected type of content.

Figure 5C:
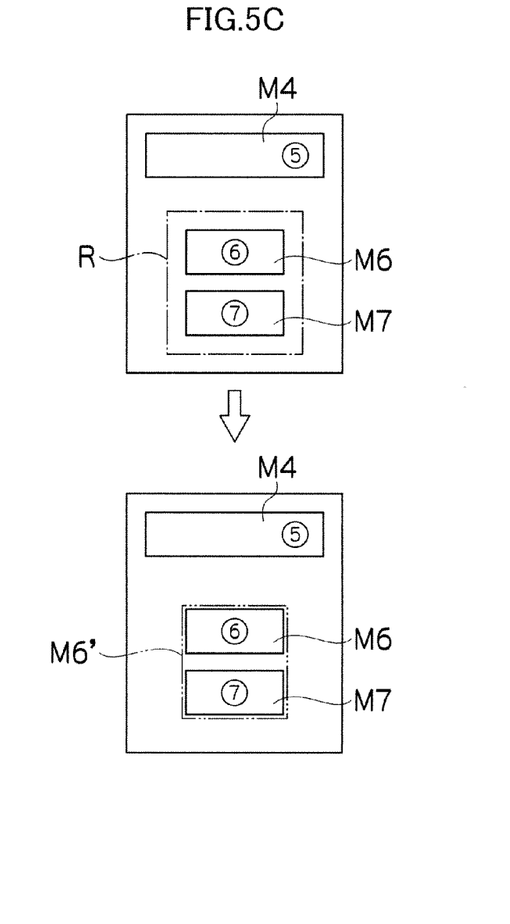

For example, as shown in FIG. 5C, assume that the frame sequence of the three frames M4, M6 and M7 has been determined. It is also provided that the frames M6 and M7 fit within a display region R in one screen of the reproduction terminal 3 at the same time. The anchor point information generator 13 integrates the frames M6 and M7 into one unit M6'. The anchor point information generator 13 assigns the unit M6' with a sixth turn, next to the frame M4, pursuant to the anchor point generation rule B.

One screen of the reproduction terminal 3 recited here varies with types of the reproduction terminal 3. Accordingly, the unit for dividing a frame and the unit for integrating frames also vary with types of the reproduction terminal 3. That is, the unit for dividing a frame and the unit for integrating frames depend on types of the reproduction terminal 3.

Even on the same cartoon, if a subgenre (comics for boys, comics for girls or the like) is different, arrangement of frames and the way of drawing frames tend to be completely different. Accordingly, it is preferable to analyze content according to the type of the content selected by the user.

Figure 6A:
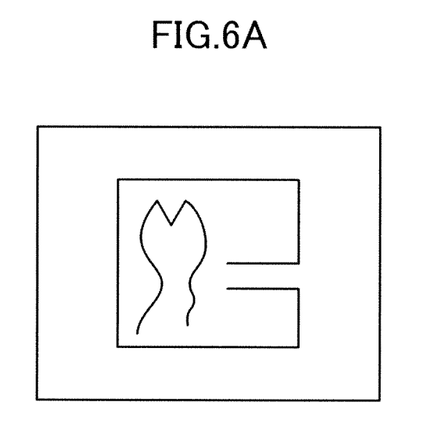
FIGS. 6A and 6B are diagrams showing an example of a special frame disposition of a cartoon.
Figure 6B:
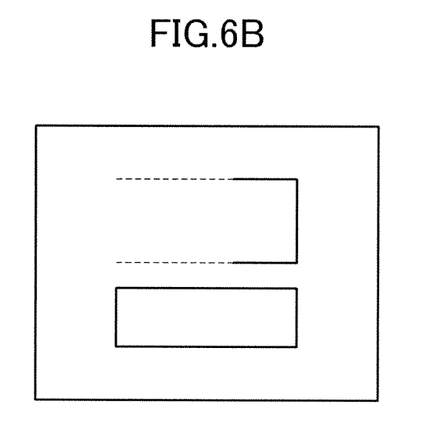

For example, as exemplified in FIGS. 6(A) and 6(B), a comic for girls has characteristics different from characteristics of a comic for boys. That is, in a comic for girls, boundaries of different frames overlap each other (FIG. 6A) and the boundary of a frame is not clearly drawn (FIG. 6B). Accordingly, it is preferable to adopt an algorithm of analyzing content of a comic for girls different from that of a comic for boys.

In a case where the type of the content is a type other than a cartoon, for example a case of a magazine, content elements such as the body of an article, a diagram, a photograph and a title are identified instead of frames, and a sequence of these content elements is determined pursuant to the anchor point generation rule.

Execution results of respective steps are displayed on the display one by one. Appropriateness of each result is confirmed by the user. Here, corrections of the execution results of respective steps can be input from a user interface. For example, if the frame sequence is inappropriate, the frame sequence can be corrected from the user interface.

Figure 7:
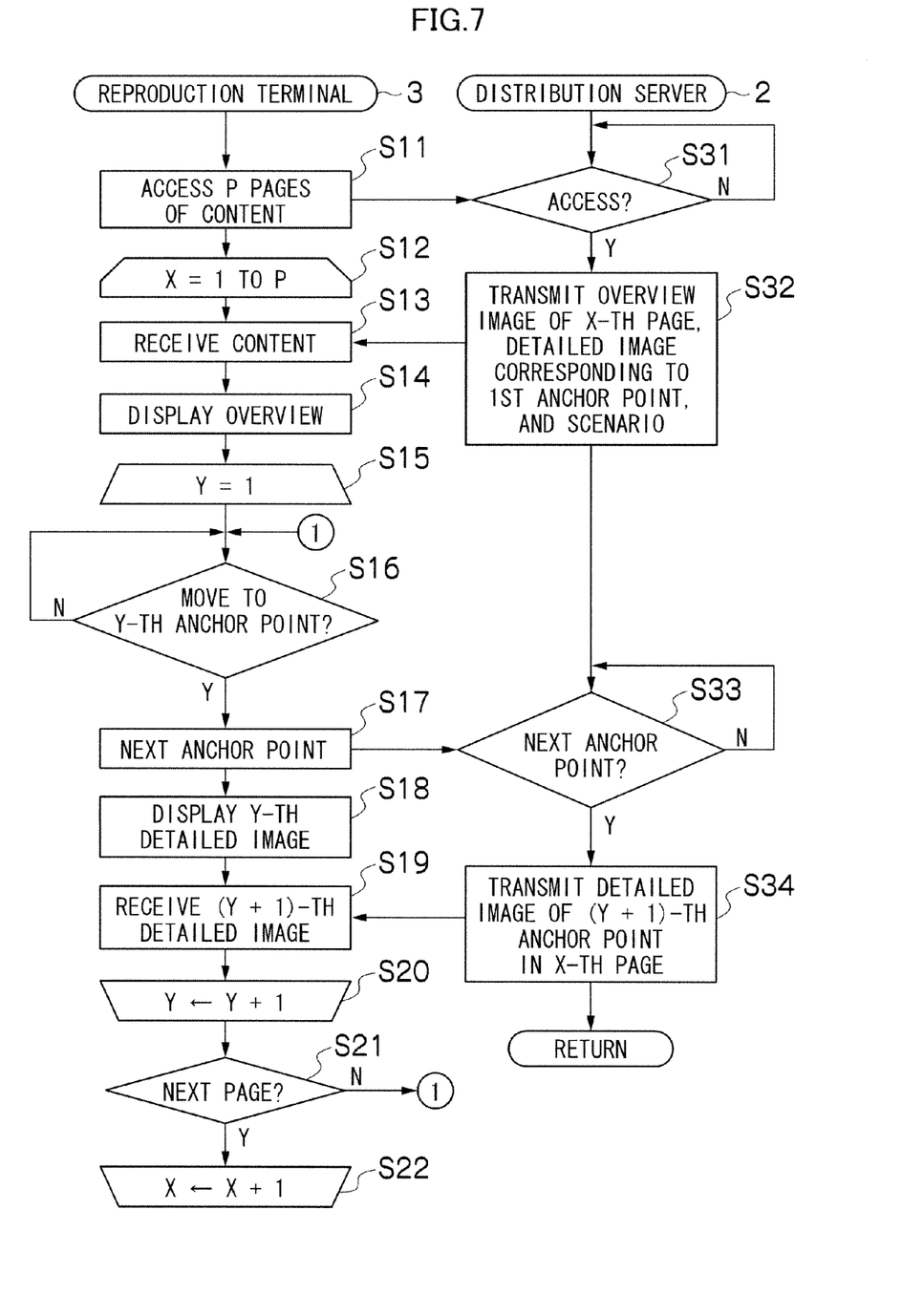
FIG. 7 is a flowchart of a distribution process.

FIG. 7 shows a flowchart of a distribution process performed between the reproduction terminal 3 and the distribution server 2. Steps S11 to S22 are performed by the reproduction terminal 3. Steps S31 to S34 are performed by the distribution server 2. Programs causing the distribution server 2 or the reproduction terminal 3 to respectively perform these processes are stored in respective non-transitory computer readable storing media (RAM, ROM, CD-ROM, etc.) of the distribution server 2 or the reproduction terminal 3.

The process in the reproduction terminal 3 is as follows. Note that an unspecified number of reproduction terminals 3 can be connected to the distribution server 2.

In step S11, the reproduction terminal 3 accesses the distribution server 2 and requests distribution of total p pages of reproduction content, responsive to an operation of requesting distribution issued by a user. The distribution request includes information identifying the model type of the reproduction terminal 3. The number p is the total number of pages corresponding to the content. The number p has been acquired by the content analyzer 12.

In step S12, the reproduction terminal 3 sets values to X in a sequence of X=1, 2, . . . , p, and repeats a loop of steps S12 to S22 every time the value is set.

In step S13, the reproduction terminal 3 receives from the distribution server 2 an overview image of the X-th page in total p pages of reproduction content and a detailed image and a reproduction scenario corresponding to the first anchor point in p pages, and stores these images and scenario in a storing medium, such as a RAM and a memory card.

In step S14, the reproduction terminal 3 receives the overview image of the desired X-th page (e.g. X=1) corresponding to the model type information of the reproduction terminal 3, the reproduction scenario of the X-th page and the detailed image corresponding to the first anchor point of the X-th page, which have been transmitted from the distribution server 2.

Figure 8A:
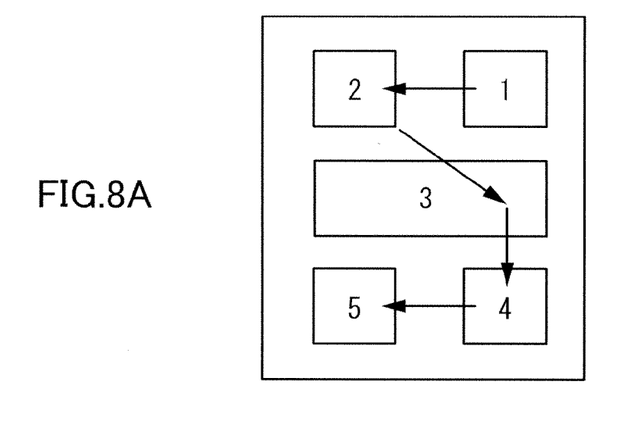
FIGS. 8A, 8B and 8C are diagrams showing an example of original content, anchor point information and a detailed image.
Figure 8B:
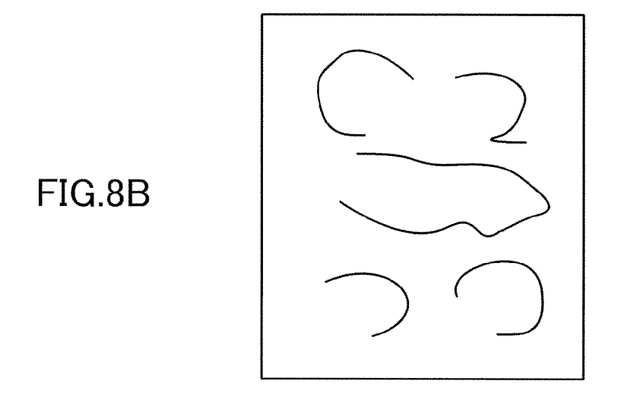

In step S14, the reproduction terminal 3 displays on screen the overview image of the X-th page corresponding to the model type information of the reproduction terminal 3 received from the distribution server 2. FIG. 8A shows an example of the reproduction content and anchor point information embedded therein corresponding to the X-th page. FIG. 8B shows an example of the overview image corresponding to the X-th page. In actuality, the anchor point information embedded in the reproduction content is invisible.

In step S15, the reproduction terminal 3 sets values to Y in a sequence of Y=1, 2, ..., q, and repeats a loop of steps S15 to S20 every time the value is set. The number q is the total number of frames corresponding to the presently displayed X-th page. The number q has been acquired by the content analyzer 12.

In step S16, the reproduction terminal 3 determines whether an anchor point moving event which is an event to move screen display to the Y-th anchor point (e.g. Y=1) in the X-th page has occurred or not. In a case of Yes, the processing proceeds to step S17. For example, in a case where stop time at the presently displayed anchor point specified in the reproduction scenario has elapsed, it is determined that the anchor point moving event has occurred. Even in a case where the stop time has not elapsed yet, if move to the next anchor point is instructed by a user's operation, it is determined that the anchor point moving event has occurred.

In step S17, the reproduction terminal 3 accesses the distribution server 2, and issues a request to distribute all parts or a part of detailed images corresponding to the (Y+1)-th anchor point and thereafter in the X-th page corresponding to the model type information of the reproduction terminal 3. The detailed images corresponding to the (Y+1)-th anchor point and thereafter are identified from the anchor point information and the reproduction scenario.

Figure 8C:
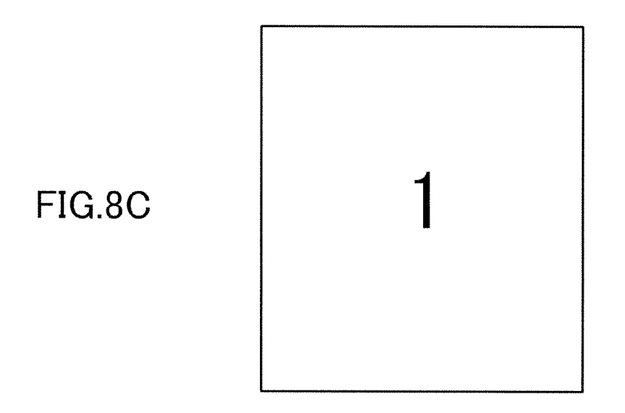

In step S18, the reproduction terminal 3 displays on screen the detailed image corresponding to the Y-th anchor point in the X-th page corresponding to the model type information of the reproduction terminal 3. FIG. 8C shows the detailed image corresponding to the first anchor point displayed on the screen as an example. The enlargement factor and the stop time of the detailed image displayed are pursuant to the reproduction scenario. However, the enlargement factor can arbitrarily be changed by a user's operation.

In step S19, the reproduction terminal 3 receives from the distribution server 2 all parts or a part of the detailed images corresponding to the (Y+1)-th anchor point and thereafter in the X-th page corresponding to the model type information of the reproduction terminal 3, and stores the images in the storing medium. It will be described later what amount of detailed images the reproduction terminal 3 receives.

In step S20, the reproduction terminal 3 increments Y by one.

In step S21, the reproduction terminal 3 determines whether the instruction of display switching to the (X+1)-th page has been input from the user or not. In a case of Yes, the processing proceeds to step S22. In a case of No, the processing returns to step S16.

In step S22, the reproduction terminal 3 increments X by one. The processing returns to step S12.

The process in the distribution server 2 is as follows.

In step S31, the distribution server 2 determines whether to receive from reproduction terminal 3 the request to distribute the total p pages of reproduction content or not. In a case of Yes, the processing proceeds to step S32.

In step S32, the distribution server 2 receives the overview image of the X-th page of the total p pages of reproduction content corresponding to the model type information of the reproduction terminal 3, and the detailed image corresponding to the first anchor point in the p-th page and the reproduction scenario, from the processed content DB 24 and the reproduction scenario DB 25, respectively, and then transmits these images and scenario to the reproduction terminal 3 having transmitted the distribution request.

In step S33, the distribution server 2 determines whether to receive the request to distribute the detailed image corresponding to the (Y+1)-th anchor point of in the X-th page corresponding to the model type information of the reproduction terminal 3 or not. In a case of Yes, the processing proceeds to step S34.

In step S34, the distribution server 2 receives from the processed content DB 24 the detailed images corresponding to the (Y+1)-th anchor point and thereafter in the X-th page corresponding to the model type information of the reproduction terminal 3, and transmits these images to the reproduction terminal 3. It is determined whether to transmit only the detailed images corresponding to the (Y+1)-th anchor point among the detailed images corresponding to the (Y+1)-th anchor point and thereafter or transmit the (Y+1)-th and all parts or a part of detailed images corresponding to the anchor points of (Y+2) and thereafter, according to the amount (size) of the Y-th detailed image in the X-th page, the amount of the text in the detailed image corresponding to the Y-th anchor point in the X page or the stop time.

For example, if the amount (size) of the Y-th detailed image in the X-th page is large, the distribution server 2 regards the remaining amount of the storing medium in the reproduction terminal 3 as small and then transmits only the detailed images corresponding to the (Y+1)-th anchor point and thereafter. On the contrary, if the amount (size) of the Y-th detailed image in the X-th page is small, the distribution server 2 regards the remaining amount of the storing medium of the reproduction terminal 3 as large and then transmits the detailed images corresponding to at least two detailed images corresponding to the (Y+1)-th anchor point and thereafter.

If the amount of the text corresponding to the Y-th anchor point in the X-th page is large or the stop time is long, there is temporal allowance until movement to the (Y+1)-th anchor point and thereby the distribution server 2 transmits the detailed images corresponding to at least two anchor points of (Y+1)-th turn and thereafter. On the contrary, if the amount of the text corresponding to the Y-th anchor point in the X-th page is small or the stop time is short, there is little temporal allowance until movement to the (Y+1)-th anchor point and thereby the distribution server 2 transmits only the detailed image corresponding to the (Y+1)-th anchor point.

Here, as long as the distribution request by the reproduction terminal 3 is performed, the operation of steps S31 to S34 is repeated until the reproduction scenario corresponding to the content, all overview images and all detailed images corresponding to all pages are transmitted.

The content corresponding to the model type information of the reproduction terminal 3 is thus transmitted responsive to transition of the anchor point, from the distribution server 2 to the reproduction terminal 3. Here, anticipatory distribution of the content corresponding to the next anchor point and thereafter is performed responsive to the amount of content corresponding to the present anchor point and the amount of the text corresponding thereto or stop time. Accordingly, distribution management matching with the reproduction terminal 3 can be appropriately performed.

Figure 9:
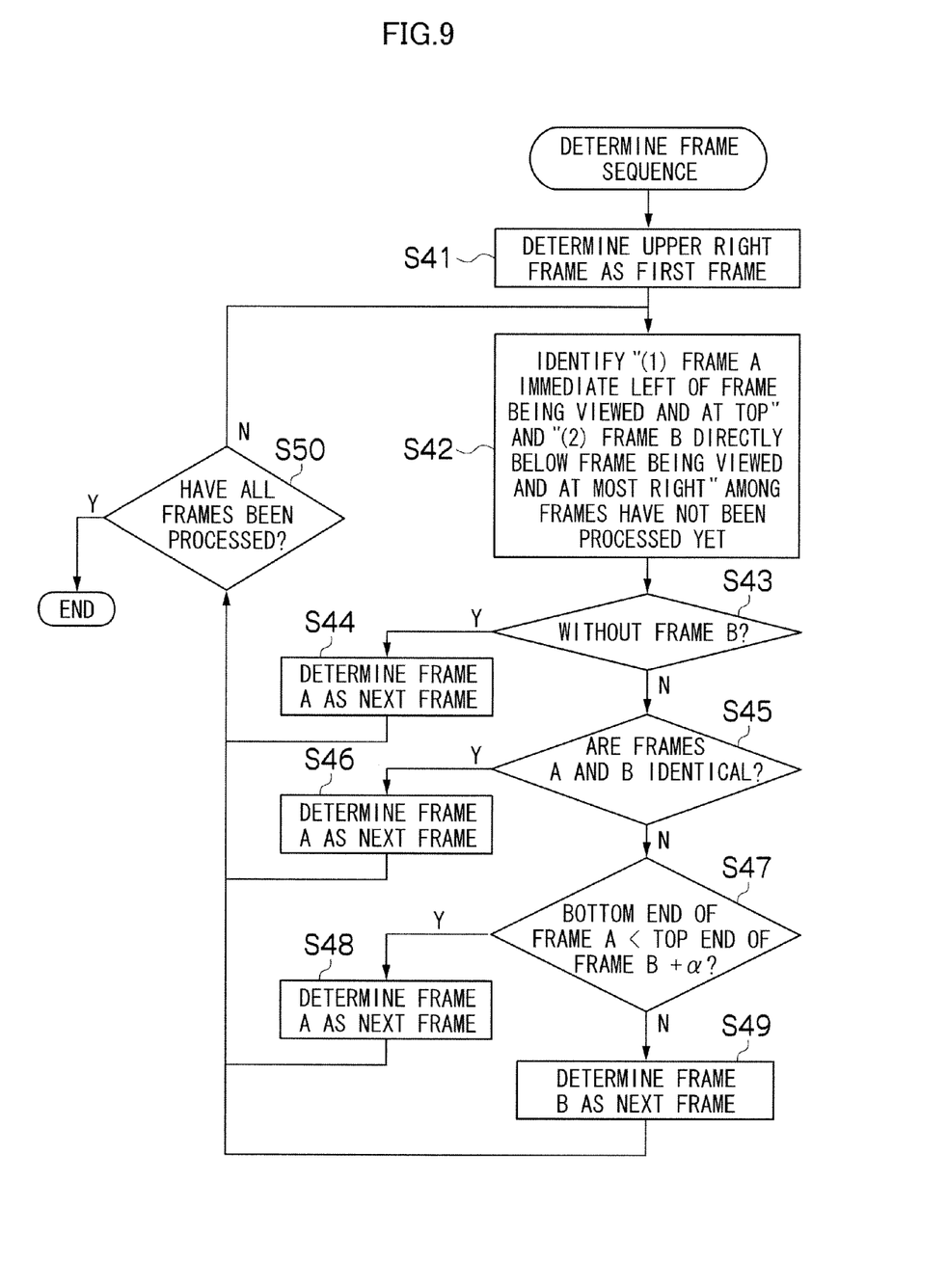
FIG. 9 is a diagram showing an example of anchor point generation rule for a cartoon which is written by an algorithm.

The anchor point generation rule stored in the rule DB 22 may be an algorithm. FIG. 9 shows an example of anchor point generation rule (frame sequence determination) which corresponds to the cartoon and is written by an algorithm.

In step S41, the anchor point information generator 13 determines the turn of the most upper right frame of a specific page as the first on the basis of position information of all frames in the specific page indicated in the content analysis information from the content analyzer 12. The first frame is set as the reference frame. The upper right point of the first frame is the nearest to the upper right point of the page.

The specific page is any one page in all pages configuring the cartoon. Accordingly, repeat of the algorithm can determine the sequence of all frames of all pages.

In step S42, the anchor point information generator 13 refers to the content analysis information, and identifies the frame A immediate left of the reference frame at the top of the page and the frame b directly below the reference frame and at the most right in the page among frames whose turn have not been determined yet.

The frame A is at the immediate left of the reference frame and at the most right among frames whose top ends are at the highest position. The frames whose top ends are at the highest position are determined as follows. If there are no top end coordinates of a frame above the top end coordinates of a certain frame, the anchor point information generator 13 determines this frame as a frame at the top end of the page. However, in a case where there are other frames whose top ends are above the top end of a certain frame, the anchor point information generator 13 sorts the frames according to actually measured distances up to the end of the page; if the variation width of the actually measured distances from the top end of the group of frames to the top end of the page is within ±e, the group of frames is identified as frames at the top end of the page in common. For example, the value of e is from 5 to 20 dots. This value is empirically determined. Further, the point information generator 13 identifies the frame A which is at the left of the reference frame and the most right position among the frames whose top ends are the highest.

The frame b is the highest frame among frames whose top end is below the bottom end of the reference frame, and is at the most right position. As with the above description, it may be determined that all frames whose distances from the bottom end of the reference frame are within a prescribed extent are frames at the bottom end of the reference frame. For example, in a case where there are other frames whose top ends are above the top end of a certain frame, the frames are sorted according to the sequence of actually measured distances between the top ends of these frames and the bottom end of the reference frame; if the variation width of the actually measured distances is within ±e, all these frames are identified as frames at the bottom end of the reference frame. Further, the point information generator 13 identifies the frame b directly below the reference frame and at the most right among frames at the bottom end of the reference frame.

In step S43, the anchor point information generator 13 determines whether the frame b is in a specific page or not. If it is determined that the frame is not therein, the processing proceeds to step S44. If it is determined that the frame is therein, the processing proceeds to step S45.

In step S44, the anchor point information generator 13 determines the turn of the frame A as the turn of the reference frame+1.

In step S45, the anchor point information generator 13 determines whether the frame A and the frame B are identical to each other or not. If it is determined that the frames are identical, the processing proceeds to step S46. If it is not determined that the frames are identical, the processing proceeds to step S47.

In step S46, anchor point information generator 13 determines the turn of the frame A as the turn of the reference frame+1.

In step S47, the anchor point information generator 13 determines whether the bottom end of the frame A<the top end of the frame b+α or not. In a case of Yes, the processing proceeds to step S48. In a case of No, the processing proceeds to step S49. α is a threshold for determining whether transition is made to the frame A immediate left of the reference frame or to the frame b immediate below the reference frame. The larger α becomes, the higher the possibility of the turn transitioning from the reference frame to the frame A becomes. The smaller α becomes, the higher the possibility of the turn transitioning from the reference frame to the frame b becomes. For example, α is empirically determined within an extent from 0.2 to 0.6.

In step S48, the anchor point information generator 13 determines the turn of the frame A as the turn of the reference frame+1.

In step S49, the anchor point information generator 13 determines the turn of the frame b as the turn of the reference frame+1.

In step S50, the anchor point information generator 13 determines whether the turns of all frames have been determined or not. In a case of No, the processing returns to step S42. In a case of Yes, this process is finished.

The anchor point information generator 13 generates pieces of anchor point information of respective frames according to the sequence of the frames. For example, if the width of the frame is smaller than a prescribed value, e.g. 70% of the page width, the anchor point information generator 13 determines the center of each frame as the position coordinates of the anchor point and the sequence of these frames as the sequence of movement of the anchor point. If the width of the frame is larger than the prescribed value, the anchor point information generator 13 determines a right part region, a middle part region and a left part region of each frame as the position coordinates of the anchor points, assigns suffix numbers to the right, middle and left part regions according to the sequence of the frames, and determines the sequence as the sequence of movement of the anchor point in the frame.

Figure 10A:
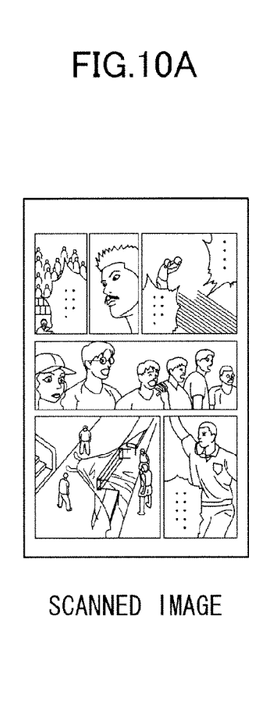
FIGS. 10A, 10B, 10C and 10D are diagrams showing an example of a frame sequence and an anchor point for a cartoon.
Figure 10B:
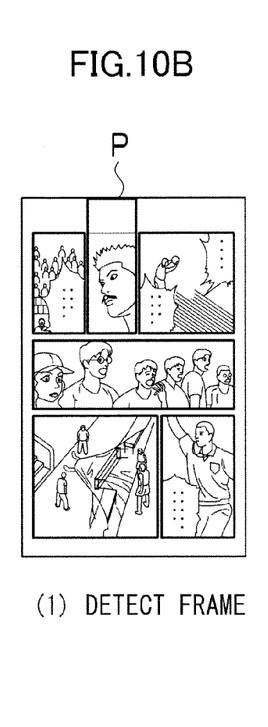
Figure 10C:
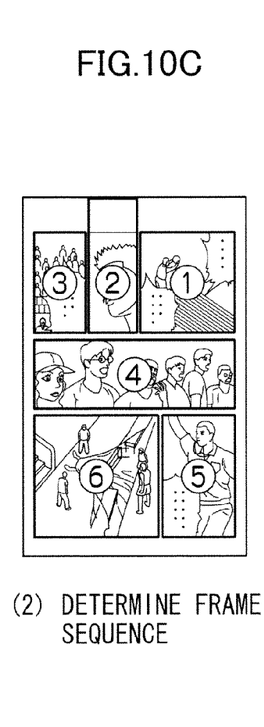
Figure 10D:
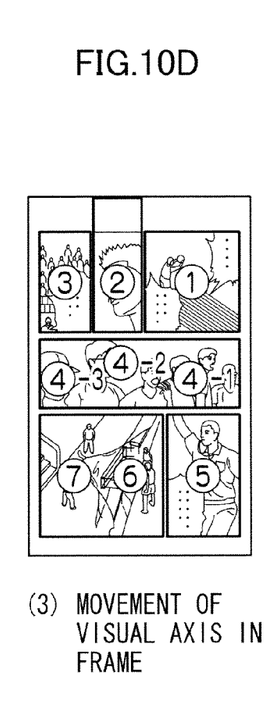

FIG. 10A shows an example of the cartoon input from the content input section 11. FIG. 10B shows an example of position coordinates P of the frame of the cartoon analyzed by the content analyzer 12. FIG. 10C shows an example of the sequence of the frames of the cartoon determined by the anchor point information generator 13 pursuant to the above algorithm. FIG. 10D shows an example of the anchor point information determined by the anchor point information generator 13.

What is claimed is:

1. A content analysis apparatus comprising:
an input device configured to input comic content;
a content analyzing-device configured to analyze frames for each page of the comic content input into the input device and acquires content analysis information which is information pertaining to the frames for each page of the comic; and
an information generating device configured to identify a first frame which is vertically adjacent to a base frame set on a frame on a page of the comic content and a second frame which is horizontally adjacent to the base frame, and generate information indicating a transition sequence of the frames of the comic content by selecting either of the first frame and second frame as a next frame which a reader reads next to the base frame according to a predetermined rule regarding a relative positional relationship between the first frame and the second frame, wherein the predetermined rule includes:
the first frame is determined to be the next frame which the reader reads next to the base frame, if the second frame is not identified;

the first frame is determined to be the next frame which the reader reads next to the base frame, if the second frame is identified and the first frame is identical to the second frame;

the first frame is determined to be the next frame which the reader reads next to the base frame, if the second frame is identified, the first frame is not identical to the second frame, and a vertical coordinate of a downmost side of the first frame is less than a predetermined threshold value plus the vertical coordinate of a uppermost side of the second frame; and the second frame is determined to be the next frame which the reader reads next to the base frame, if the second frame is identified, the first frame is not identical to the second frame, and the vertical coordinate of the downmost side of the first frame is not less than the predetermined threshold value plus the vertical coordinate of the uppermost side of the second frame.

2. The content analysis apparatus according to claim 1, further comprising:
 a converting device configured to converts the original content input from the input device into distribution content which comprises an image according to the information and a model type of a terminal; and
 an information embedding device configured to embeds the information generated by the information generating device in the distribution content converted by the converting device.

3. The content analysis apparatus according to claim 2, further comprising:
 a scenario generating device configured to determines a stop time of the distribution content for each anchor point generated by the information generating device according to at least one of the model type of the terminal and the content analysis information, and generates a scenario indicating the stop time for each anchor point.

4. The content analysis apparatus according to claim 3, further comprising:
 a content database in which the distribution content with the embedded information is stored for each model type of a terminal;
 a scenario database in which the scenario generated by the scenario generating device is stored and associated with at least one of the model type of the terminal and the content analysis information;
 a distributing device configured to extracts a scenario corresponding to a model type of a terminal accessing the apparatus from the scenario database, extracts distribution content corresponding to the model type of the terminal from the content database, and distributes the extracted scenario and the distribution content to the terminal; and
 a terminal device configured to receives the scenario and the distribution content from the distributor, and reproduces the distribution content pursuant to the scenario.

5. The content analysis apparatus according to claim 3, wherein the scenario generating device determines a display magnification of the distribution content for each anchor point generated by the information generating device according to specification including a screen size of the terminal, and generates a scenario indicating the display magnification for each anchor point.

6. The content analysis apparatus according to claim 1, wherein the input device receives an image of the original content and supplementary information, and the content analyzing device acquires the content analysis information on the basis of the image of the original content and the supplementary information.

7. The content analysis apparatus according to claim 1, wherein the information generating device determines a sequence for elements in the original content input into the input device pursuant to a prescribed analysis rule corresponding to the original content input into the input device, and generates the information on the basis of the sequence of the respective elements and the sizes of the respective elements.

8. The content analysis apparatus according to claim 7, wherein the content analyzing device accepts a selection of the type of the content to be analyzed, and analyzes the elements of the content according to the selected type of the content.

9. The content analysis apparatus according to claim 8, wherein the content analyzing device, in a case of accepting the selection of a cartoon as the type of the content to be analyzed, determines a frame of the cartoon by edge analysis and frame boundary candidate extraction.

10. The content analysis apparatus according to claim 9, wherein the content analyzing device displays a result of the frame determination on a prescribed display apparatus.

11. The content analysis apparatus according to claim 10, wherein the information generating device determines a sequence for each frame of the determined cartoon pursuant to a prescribed analysis rule corresponding to the cartoon input into the input device, and generates the information on the basis of the sequence of each frame and the frame size of each frame.

12. The content analysis apparatus according to claim 11, wherein the information generating device, in a case where the determined frame of the cartoon does not fit within a screen size of a terminal, divides the frame into sizes fitting within the screen size, determines a sequence of frames including frames after division pursuant to a prescribed analysis rule corresponding to the cartoon, and generates the information on the basis of the sequence of the frames and the frame sizes.

13. The content analysis apparatus according to claim 12, wherein the information generating device divides the frame so as to match a shape of a screen of the terminal.

14. The content analysis apparatus according to claim 11, wherein the information generating device, in a case where the determined frames of the cartoon fit within a screen size of the terminal at the same time, integrates the frames, determines a sequence of frames including the frame after integration pursuant to a prescribed analysis rule corresponding to the cartoon, and generates the information on the basis of the sequence of the frames and the frame sizes.

15. A content analysis method, comprising:
 causing a computer to perform:
  inputting comic content;
  analyzing frames for each page of the comic content and acquiring content analysis information which is information pertaining to the frames for each page of the comic; and
  identifying a first frame which is vertically adjacent to a base frame set on a frame on a page of the comic content and a second frame which is horizontally adjacent to the base frame, and generating information indicating a transition sequence of the frames of the comic content by selecting either of the first frame and second frame as a next frame which a reader reads next to the base frame according to a predetermined rule regarding a relative positional relationship between the first frame and the second frame, wherein the predetermined rule includes:

the first frame to be next to be the next frame which the reader reads next to the base frame if the second frame is not identified;

the first frame to be the next frame which the reader reads next to the base frame if the second frame is identified and the first frame is identical to the second frame;

the first frame to be the next frame which the reader reads next to the base frame if the second frame is identified, the first frame is not identical to the second frame, and the vertical coordinate of a downmost side of the first frame is less than a predetermined threshold value plus the vertical coordinate of a uppermost side of the second frame; and the second frame is determined to be the next frame which the reader reads next to the base frame if the second frame is identified, the first frame is not identical to the second frame, and the vertical coordinate of the downmost side of the first frame is not less than the predetermined threshold value plus the vertical coordinate of the uppermost side of the second frame.

16. A non-transitory computer-readable medium having embodied thereon a content analysis program causing a computer to perform the content analysis method according to claim 15.

17. The content analysis apparatus according to claim 1, wherein the information generating device selects either of the first frame and the second frame as the next frame based on a distance between the first frame and the second frame.

18. The content analysis apparatus according to claim 17, wherein the information generating device selects either of the first frame and the second frame as the next frame based on a comparison between the distance and a predetermined threshold value.

* * * * *